US009726406B2

(12) United States Patent
Sekiguchi (10) Patent No.: US 9,726,406 B2
(45) Date of Patent: Aug. 8, 2017

(54) EXPANSION VALVE

(71) Applicant: Kabushiki Kaisha Saginomiya Seisakusho, Tokyo (JP)

(72) Inventor: Hideki Sekiguchi, Sayama (JP)

(73) Assignee: KABUSHIKI KAISHA SAGINOMIYA SEISAKUSHO, Tokyo (JP)

( * ) Notice: Subject to any disclaimer, the term of this patent is extended or adjusted under 35 U.S.C. 154(b) by 1220 days.

(21) Appl. No.: 13/761,538

(22) Filed: Feb. 7, 2013

(65) Prior Publication Data

US 2013/0206851 A1    Aug. 15, 2013

(30) Foreign Application Priority Data

Feb. 10, 2012  (JP) .................................. 2012-027365
Feb. 10, 2012  (JP) .................................. 2012-027367

(51) Int. Cl.
*F25B 41/06*    (2006.01)
*F25B 41/04*    (2006.01)
*F16K 31/04*    (2006.01)

(52) U.S. Cl.
CPC ............ *F25B 41/043* (2013.01); *F16K 31/04* (2013.01); *F25B 41/062* (2013.01);
(Continued)

(58) Field of Classification Search
CPC .. F25B 41/043; F25B 41/062; F25B 2341/06; F25B 2341/061; F25B 2341/067; F25B 2341/065; F16K 31/04; F16K 1/34; F16K 1/42; F16K 1/54; F16K 1/425; Y10T 29/49405; Y10T 29/49423; Y10T 29/49426; Y10T 29/49409; B21K 1/24
(Continued)

(56) References Cited

U.S. PATENT DOCUMENTS 3,211,419 A * 10/1965 Klinger-Lohr ............ F16K 1/36
                                                    137/630.15
5,031,416 A *  7/1991 Drucker .................. F25B 41/06
                                                        62/324.1
(Continued)

OTHER PUBLICATIONS

Kalpakjian, Serope and Steven R. Schmid. Manufacturing Engineering and Technology, Sixth Edition. Pearson, 2010: p. 384.*

*Primary Examiner* — Ryan J Walters
*Assistant Examiner* — Mark L Greene
(74) *Attorney, Agent, or Firm* — Kratz, Quintos & Hanson, LLP (57) ABSTRACT

There is provided an expansion valve which, by moving the sub-valve in a valve housing, controls the flow rate of a refrigerant in a first flow direction and releases the refrigerant to flow in a second flow direction, wherein the sub-valve is reduced in weight and a valve port is provided with high accuracy. The sub-valve includes a guide member formed by press work and a valve seat member formed by cutting. The sub-valve is seated on a sub-valve seat of a valve seat ring when the pressure in a main valve chamber is high, and is moved away from the sub-valve seat when the pressure in the main valve chamber is low. The sub-valve is reduced in weight by forming the guide member by press work, and the valve port is formed with improved accuracy by forming the valve seat member by cutting.

14 Claims, 7 Drawing Sheets

(52) U.S. Cl.
CPC ... *F25B 2341/061* (2013.01); *F25B 2341/065* (2013.01); *F25B 2341/0653* (2013.01); *Y02B 30/72* (2013.01)

(58) Field of Classification Search
USPC ....... 137/630–630.22; 251/30.03; 29/890.13, 29/890.132
See application file for complete search history.

(56) References Cited

U.S. PATENT DOCUMENTS

| | | | | |
|---|---|---|---|---|
| 5,318,063 | A * | 6/1994 | Muddiman | F16K 15/038 137/454.2 |
| 8,157,183 | B2 * | 4/2012 | Hayashi | F25B 41/062 236/92 B |
| 2009/0293520 | A1 * | 12/2009 | Hayashi | F25B 41/062 62/222 |

* cited by examiner

EXPANSION VALVE

CROSS REFERENCE TO RELATED APPLICATIONS

This application is on the basis of Japanese Patent Applications No. 2012-27365 and No. 2012-27367, the contents of which are hereby incorporated by reference.

TECHNICAL FIELD

The present invention relates to an expansion valve provided in a heat pump type refrigeration cycle system and arranged to reduce a flow rate of a refrigerant in a first flow direction of the refrigerant and allow a high flow by reducing a pressure loss as much as possible.

BACKGROUND OF THE INVENTION

Conventionally, many heat pump type refrigeration cycle systems are provided with an expansion valve arranged at an outdoor heat exchanger (i.e. an outdoor unit). In this case, a refrigerant which is expanded by the expansion valve flows into an indoor heat exchanger through a long pipe conduit. Thus, a pressure loss occurs in the expanded refrigerant, causing difficulty in controlling the flow rate at the expansion valve. This is the same for the case when the expansion valve is provided at the indoor heat exchanger.

Meanwhile, Japan Patent Application Publication No. 2009-287913 discloses a heat pump type refrigeration cycle system having expansion valves which function to control, i.e. reduce, the flow rate at the indoor heat exchanger during a cooling mode and reduce the flow rate at the outdoor heat exchanger during a heating mode.

The expansion valve disclosed in the above-mentioned Japan Patent Application Publication No. 2009-287913 is provided with a valve seat member (2, 8) as a sub-valve in order to reduce the flow rate of the refrigerant in a first flow direction of the refrigerant and allow a high flow in a second flow direction while reducing the pressure loss as much as possible. The valve seat member (2, 8) is arranged to slidably move in a direction of an axis in a valve housing (1, 7).

However, for the expansion valves disclosed in the above-mentioned Japan Patent Application Publication No. 2009-287913, there is a problem that since the valve seat member (2) is a thick member and heavy, it has difficulty in operation of moving away from a second port (12). On the other hand, the seat valve member (8) according to another embodiment which is formed by press work is a lightweight member, and thus it operates smoothly when moving away from a second port (72). However, since this valve seat member (8) is provided with a valve port (81a) which is also formed by press work, it is difficult to provide accuracy in a diameter and shape of the valve port (81a), causing an increase in risk of valve leakage between the valve port (81a) and a valve body (51).

SUMMARY OF THE INVENTION

In view of the above-described problem, it is an object of the present invention to provide an expansion valve arranged in a heat pump type refrigeration cycle system and arranged to reduce a flow rate of a refrigerant in a first flow direction of the refrigerant and allow a high flow in a second flow direction of the refrigerant by reducing a pressure loss as much as possible by moving a sub-valve in a valve housing, in which the sub-valve is reduced in weight, and a valve port of the sub-valve is provided with improved accuracy.

In order to achieve the above-described object, the present invention provides, according to a first aspect, an expansion valve having: a valve housing defining a cylindrical main valve chamber; a first port communicated with the main valve chamber; a second port communicated with an axial end of the main valve chamber; a sub-valve arranged in the main valve chamber so as to move in a direction of an axis of the main valve chamber, the sub-valve having a valve port located between the main valve chamber and the second port; and a valve body arranged to move in the direction of the axis of the main valve chamber with respect to the sub-valve to open and close the valve port, wherein when a refrigerant flows from the first port to the second port, the sub-valve is seated on a circumference of the second port due to difference in pressures in the first port and the second port to make the second port to be in a closed state and a flow rate of the refrigerant flowing through the valve port is reduced by the valve body, and when the refrigerant flows from the second port to the first port, the sub-valve moves away from the second port due to difference in pressures in the first port and the second port to make the second port to be in a fully-open state, wherein the sub-valve includes: a guide member arranged to slidably contact with an inner circumferential face of the valve housing and formed by pressing a metal plate; and a valve seat member having the valve port and arranged at a center of the guide member, the valve seat member being formed by cutting a metal material.

Furthermore, according to a second aspect of the present invention, the guide member includes a disk portion arranged to intersect perpendicularly with the axis of the main valve chamber, a fitting hole formed at a center of the disk portion, and a plurality of guide plates extending perpendicularly from a periphery of the disk portion, and the valve seat member includes a disk-like flange portion and a ring-like annular boss portion formed at an upper part of the flange portion. The annular boss portion of the valve seat member is passed through the fitting hole of the guide member, and an end of the annular boss portion is crimped so as to extend outward to bond the flange portion and the disk portion tightly together, and a spot welding is applied to a contact portion at which an edge of the disk portion and an edge of the flange portion contact each other to firmly fix the guide member and the valve seat member to each other.

Furthermore, according to a third aspect of the present invention, burrs formed, due to the pressing, on side edges of the guide plate extending parallel to the axis of the main valve chamber are located at inner side, and a shear droop side formed, due to the pressing, on an edge of the disk portion at which the spot welding is applied, is located on the edge of the disk portion distant from the flange portion.

Furthermore, according to a fourth aspect of the present invention, only the side edges of the guide plate extending parallel to the axis of the main valve chamber are arranged in contact with an inner circumferential face of the valve housing, so that when the sub-valve moves in the direction of the axis of the main valve chamber, the guide plate contacts in a line contact fashion with the inner circumferential face of the valve housing.

Furthermore, according to a fifth aspect of the present invention, the guide plate is formed into a flat-plate shape.

Furthermore, according to a sixth aspect of the present invention, the guide plate is curved in a direction opposite to the inner circumferential face of the valve housing.

Furthermore, according to a seventh aspect of the present invention, the plurality of guide plates are arranged in a rotationally-symmetrical fashion around the axis of the main valve chamber, and the number of the guide plates is three or four.

According to the first aspect of the present invention, since the sub-valve is provided with the guide member formed of the metal disk formed by press work, the sub-valve itself can be reduced in weight. Furthermore, since the valve seat member is formed by cutting, the valve port can be formed with high accuracy, thereby preventing the valve leakage and providing the expansion valve with high reliability.

According to the second aspect of the present invention, the guide member and the valve seat member of the sub-valve can be bonded firmly together by the crimping and the spot welding.

According to the third aspect of the present invention, the burr formed due to the press work does not exist at the contact portion at which the side edges of the guide plate which contacts in a line contact fashion with the inner circumferential face of the valve housing. Consequently, the sub-valve can slidably move smoothly, achieving a stable operation of the sub-valve. Furthermore, the shear droop side of the disk portion is located distant from the flange portion. That is, the burr formed on the disk portion due to the press work is located adjacent to the flange portion before the application of the spot welding. Thus, by making this burr to be located at outside of the flange portion, this burr melts during the application of the spot welding. Consequently, the disk portion and the flange portion can be closely attached to each other without any space between each other. Thus, the spot welding can be performed more reliably.

According to the fourth aspect of the present invention, the guide plate contacts with the valve housing only in a line contact fashion when the sub-valve moves in the main valve chamber of the valve housing to switch between the mode in which the refrigerant flows in a direction to reduce the flow rate and the mode in which the high flow of the refrigerant flows in the opposite direction with reduced pressure loss. Consequently, foreign particles are prevented from being caught between the guide plate and the inner circumferential face of the valve housing, thereby providing a stable operation of the sub-valve.

According to the fifth aspect of the present invention, the guide plate is formed into a flat-plate shape by the press work, thus the machining of the guide plate can be facilitated.

According to the sixth aspect of the present invention, since the gap between the guide plate and the inner circumferential face of the valve housing is increased, foreign particles are prevented from being caught in the gap, thereby providing even more stable operation of the sub-valve.

According to the seventh aspect of the present invention, by employing the optimum number of the guide plates, the sub-valve can be guided stably by the guide plates, and a decrease in the gap between the guide plates and the inner circumferential face of the valve housing due to too many guide plates can be prevented.

BRIEF DESCRIPTION OF THE DRAWINGS

This and other objects, features, and advantages of the present invention will become more apparent upon reading of the following detailed description and drawings, in which.

DESCRIPTION OF EXEMPLARY EMBODIMENTS

Figure 7:
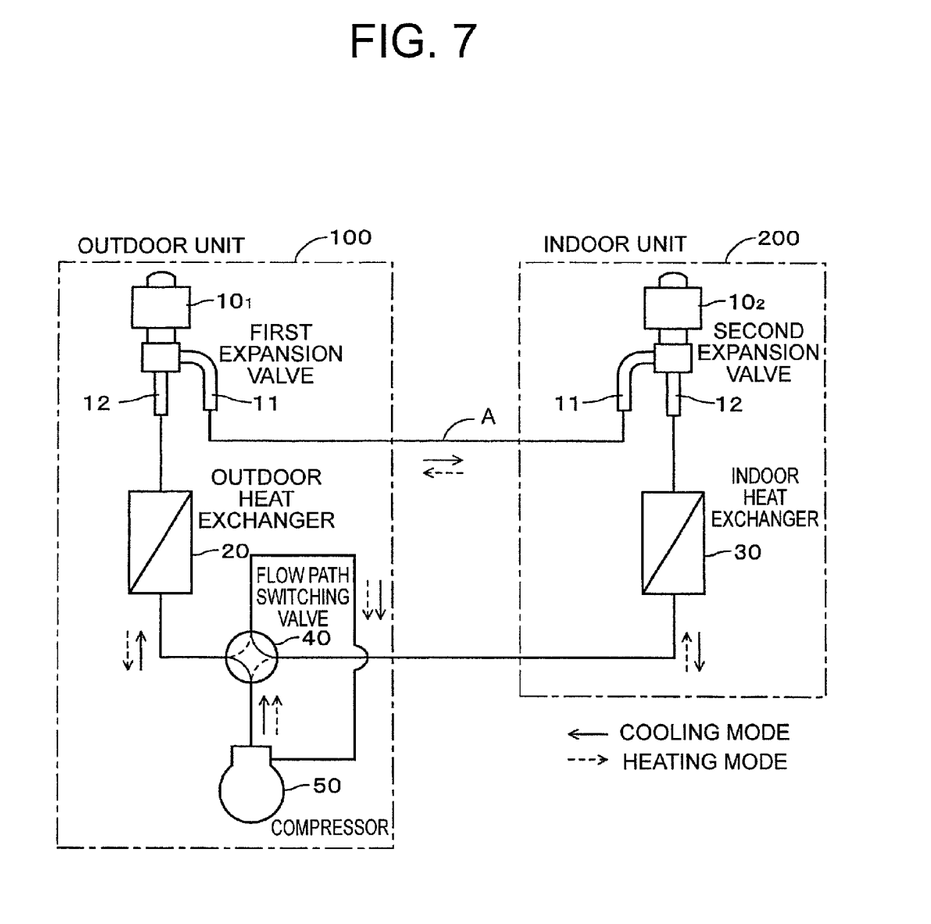
FIG. 7 is an illustration showing a heat pump type refrigeration cycle system having the expansion valve according to the present invention.

In the following, an expansion valve according to an embodiment of the present invention is explained in reference to the drawings. FIG. 7 is an illustration showing a heat pump type refrigeration cycle system having an expansion valve according to an embodiment of the present invention. Firstly, the heat pump type refrigeration cycle system according to the embodiment is explained below in reference to FIG. 7. FIG. 7 shows a first expansion valve $10_1$ and a second expansion valve $10_2$ according to the embodiment of the present invention. The first expansion valve $10_1$ is mounted to an outdoor unit 100 and the second expansion valve $10_2$ is mounted to an indoor unit 200. The expansion valves $10_1$ and $10_2$, an outdoor heat exchanger 20, an indoor heat exchanger 30, a flow path switching valve 40 and a compressor 50 are connected to each other by conduits as shown to constitute the heat pump type refrigeration cycle system.

The flow path of the refrigeration cycle can be switched between two flow paths defined as "cooling mode" and "heating mode" by the flow path switching valve 40. In the cooling mode, a refrigerant compressed by the compressor 50 flows from the flow path switching valve 40 into the outdoor heat exchanger 20, then flows through the first expansion valve $10_1$ and a pipe conduit A to the second expansion valve $10_2$. Then, the refrigerant is expanded by this second expansion valve $10_2$ and flows into the indoor heat exchanger 30. The refrigerant flow into the indoor heat exchanger 30 then flows through the flow path switching valve 40 to the compressor 50. In the heating mode, the refrigerant which is compressed by the compressor 50 flows from the flow path switching valve 40 into the indoor heat exchanger 30, then flows through the second expansion valve $10_2$ and the pipe conduit A to the first expansion valve $10_1$. Then, the refrigerant is expanded by this first expansion valve $10_1$ and circulates sequentially to the outdoor heat exchanger 20, the flow path switching valve 40 and the compressor 50.

The expansion valves $10_1$, $10_2$ are arranged to be in a fully-open state in which the flow rate of the refrigerant is not controlled, or in a semi-closed state in which the flow rate of the refrigerant is controlled and reduced. In the fully-open state, the refrigerant flows in from a joint pipe 12 and flows out from a joint pipe 11. In the semi-closed state, the refrigerant flows in from the joint pipe 11 and flows out from the joint pipe 12. Thus, in the cooling mode, the first expansion valve $10_1$ is in the fully-open state and the second expansion valve $10_2$ is in the semi-closed state. In the heating mode, the second expansion valve $10_2$ is in the fully-open state and the first expansion valve $10_1$ is in the semi-closed state. In both of the cooling mode and the heating mode, the flow rate of the refrigerant becomes high in the pipe conduit A connecting the first expansion valve $10_1$ and the second expansion valve $10_2$, thereby reducing the pressure loss before the expansion valve which functions to reduce the flow rate and improving the operation performance.

Figure 1:
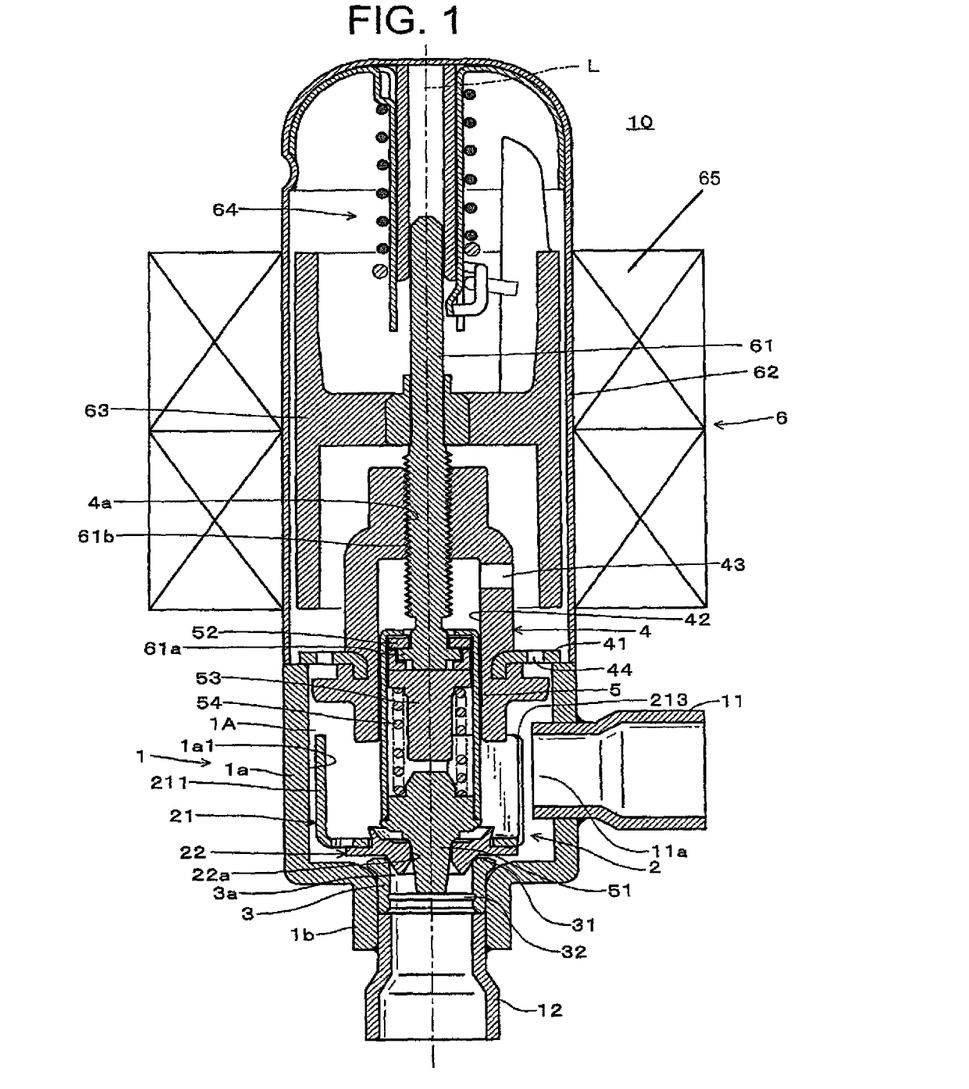
FIG. 1 is a longitudinal sectional view of an expansion valve according to one embodiment of the present invention, the expansion valve being in a semi-closed state.
Figure 2:
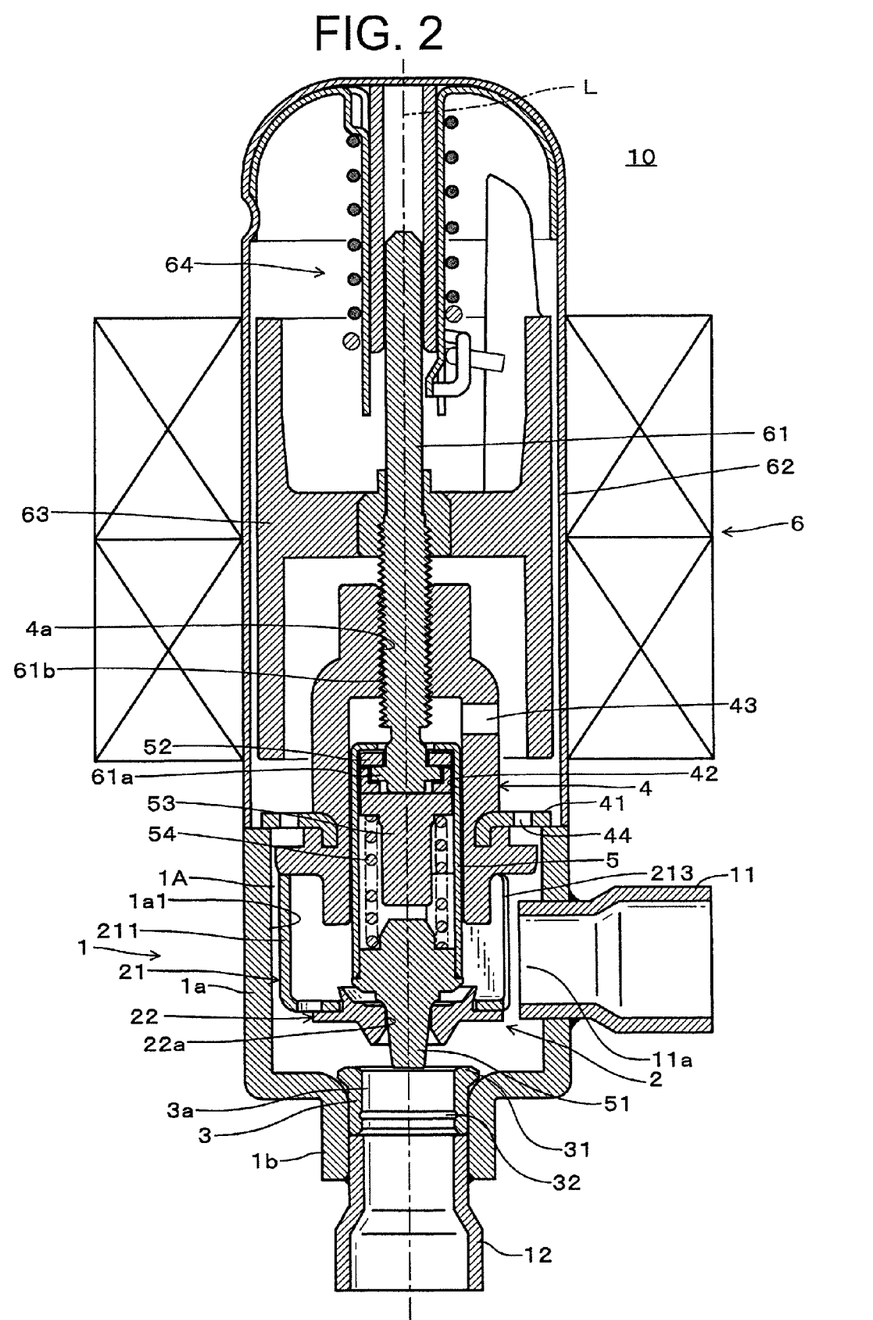
FIG. 2 is a longitudinal sectional view of the expansion valve in a fully-open state.
Figure 3A:
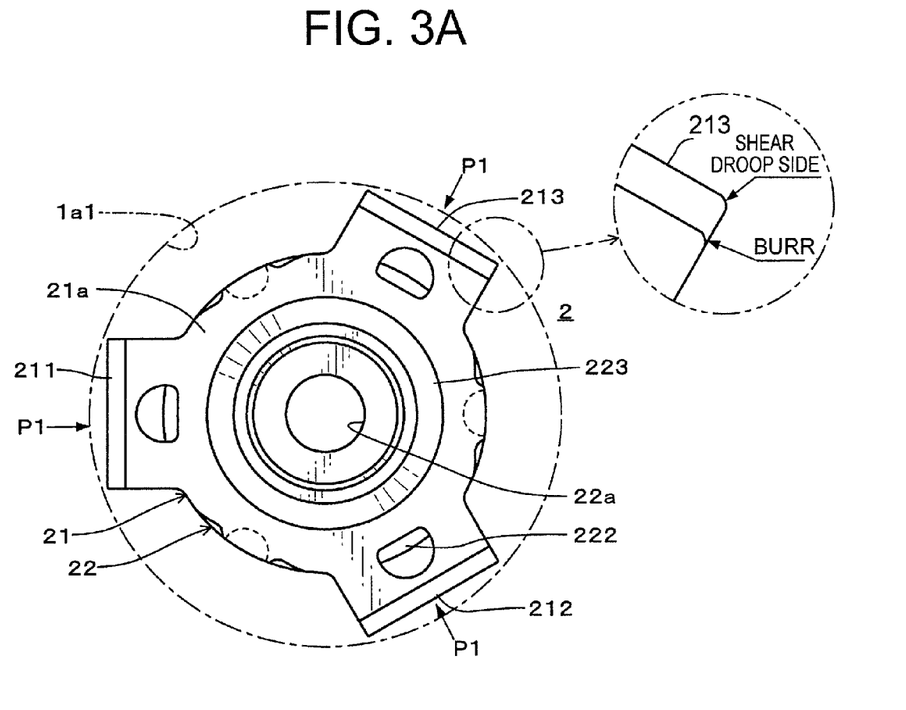
FIG. 3A is a plane view of a sub-valve according to one embodiment of the present invention.
Figure 3B:
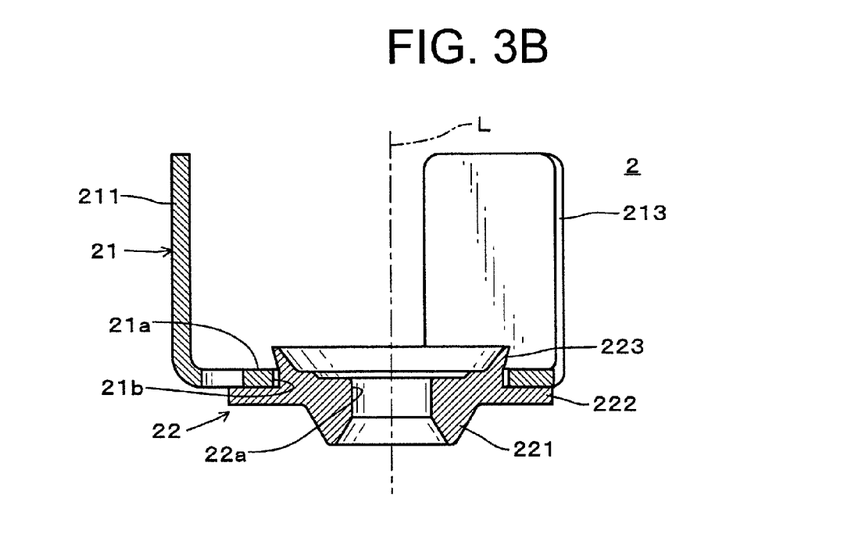
FIG. 3B is a longitudinal sectional view of the sub-valve.
Figure 4:
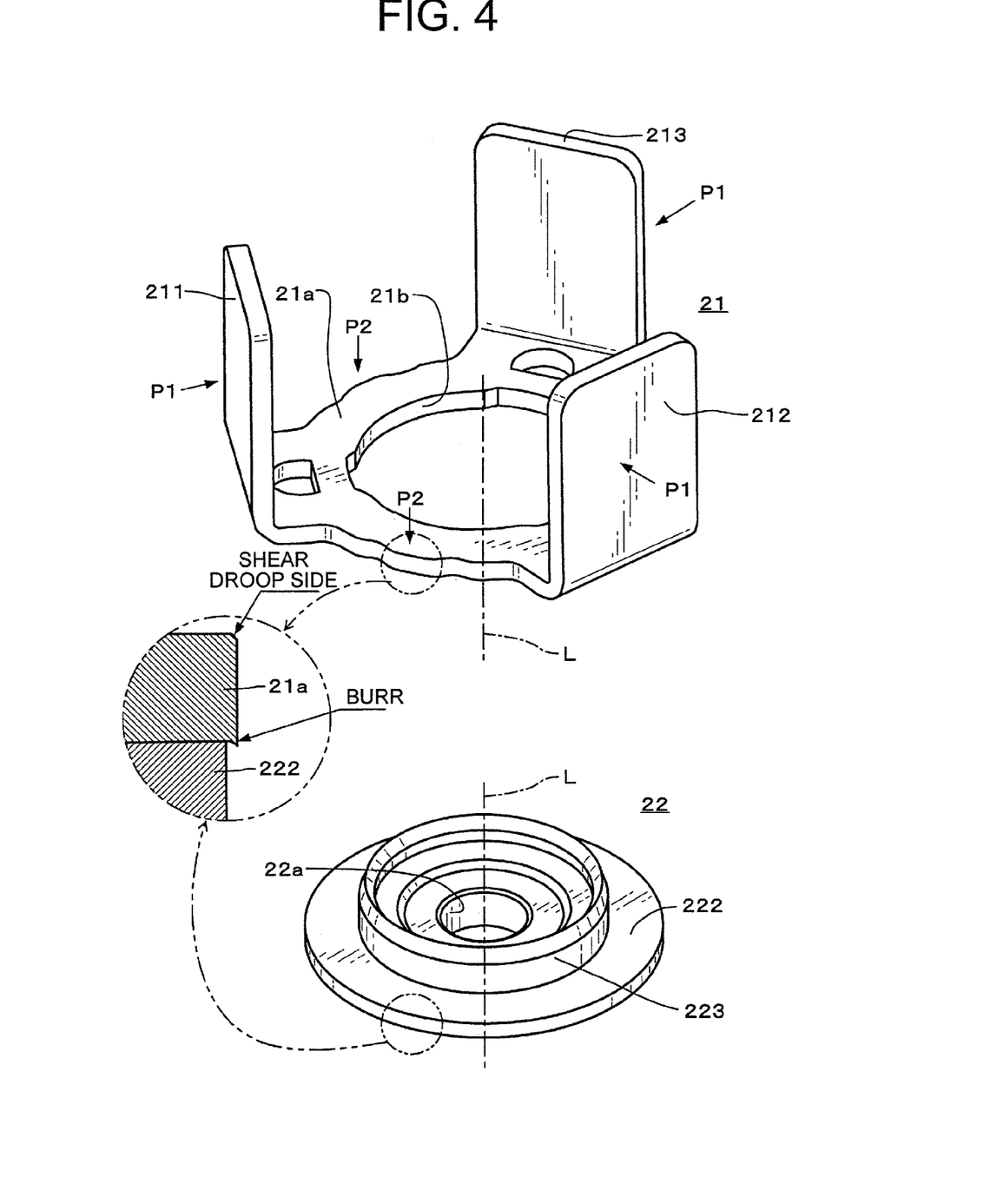
FIG. 4 is a perspective view of a guide member and a valve seat member of the sub-valve according to one embodiment of the present invention.
Figure 5:
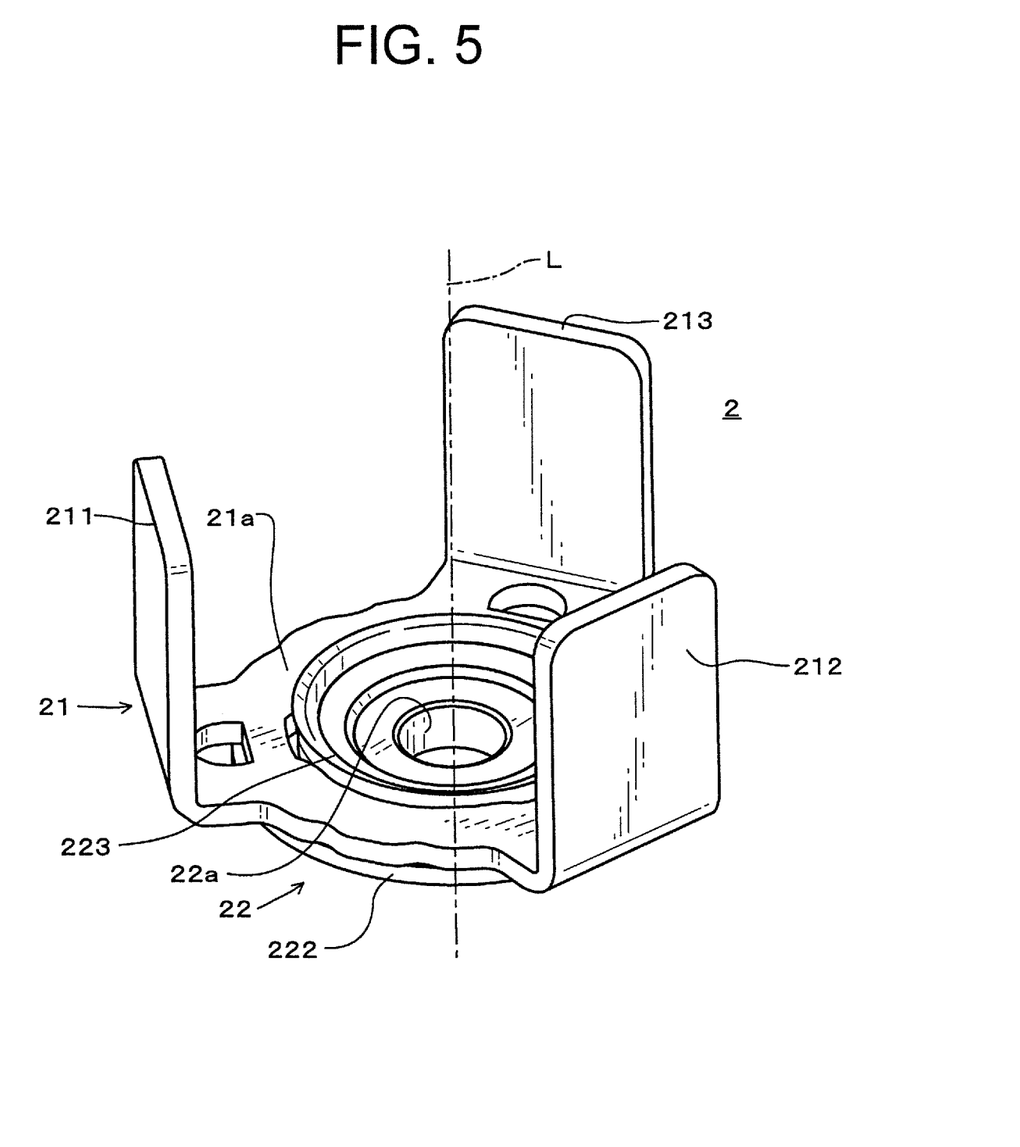
FIG. 5 is a perspective view of the sub-valve in an assembled state according to one embodiment of the present invention.

Next, the expansion valves $10_1$, $10_2$ according to the embodiment are explained below in reference to FIGS. 1 through 5. FIG. 1 is a longitudinal sectional view of the expansion valve according to the embodiment, the expansion valve being in the semi-closed state. FIG. 2 is a longitudinal sectional view of the expansion valve in the fully-open state. FIGS. 3A and 3B are a plane view and a longitudinal sectional view of a sub-valve according to the embodiment, respectively. FIG. 4 is a perspective view of a guide member and a valve seat member of the sub-valve. FIG. 5 is a perspective view of the sub-valve in an assembled state. Herein, the indexes of the reference sign of the expansion valves $10_1$, $10_2$ are used for distinction between the first expansion valve and the second expansion valve; however these indexes are omitted below when the first and second expansion valves are not distinguished.

As shown in FIG. 1 and FIG. 2, the expansion valve 10 includes a valve housing 1, and the valve housing 1 includes a body portion 1a defining a cylindrical main valve chamber 1A and a tubular portion 1b extending downward from a lower end of the body portion 1a. The joint pipe 11 is attached to an inner face on one side of the main valve chamber 1A. An end of this joint pipe 11 is a first port 11a opening into the main valve chamber 1A. A stainless-steel valve seat ring 3 is attached in the tubular portion 1b adjacent to the main valve chamber 1A, and the joint pipe 12 is attached to a lower end of the tubular portion 1b. Inside of the valve seat ring 3 corresponds to a second port 3a.

A sub-valve 2 is disposed inside of the main valve chamber 1A. As shown in FIGS. 3A and 3B, the sub-valve 2 includes a guide member 21 and a valve seat member 22. The guide member 21 includes a disk portion 21a and three guide plates 211, 212, 213. The valve seat member 22 is fixed to a center of the disk portion 21a, and a valve port 22a is formed at a center of the valve seat member 22.

There is provided a support member 4 fixed to an upper portion of the valve housing 1 by a fixture 41. The support member 4 includes a long guide hole 42 formed along a direction of an axis L and a pressure equalizing hole 43 communicated with the guide hole 42. The fixture 41 is provided with a pressure equalizing hole 44. A cylindrical valve holder 5 is passed through the guide hole 42 so as to slide in the direction of the axis L.

The valve holder 5 is attached coaxially with the main valve chamber 1A. A stainless-steel valve body 51 having a needle-like shaped end is fixed to a lower end of the valve holder 5. The valve body 51 is arranged to move in the direction of the axis L together with the valve holder 5 to increase and decrease an opening area of the valve port 22a to control the flow rate of the fluid flowing from the first port 11a to the second port 3a and reduce the flow rate of the refrigerant. The valve body 51 is arranged to slide between a fully-closed position in which the valve body 51 is moved to a lowermost position as shown in FIG. 1 and a fully-open position in which the valve body 51 is moved to an uppermost position.

The valve holder 5 is arranged in engagement with a rotor shaft 61 of a step motor 6. Specifically, a flange portion 61a is integrally formed at a lower end of the rotor shaft 61. This flange portion 61a and an upper end of the valve holder 5 together sandwich a washer 52, so that a lower end of the rotor shaft 61 is rotatably engaged at the upper end of the valve holder 5. Due to this engagement, the valve holder 5 is rotatably suspended and supported by the rotor shaft 61. Furthermore, a spring bearing 53 is movably arranged inside the valve holder 5 so as to move in the direction of the axis L. A compressed coil spring 54 which is applied with a predetermined load is disposed between the spring bearing 53 and the valve body 51, thus the spring bearing 53 is biased to the upper side and abutted on the lower end of the rotor shaft 61 in an engaged fashion.

The rotor shaft 61 is provided with a male-type screw portion 61b which is threadably mounted on a female-type portion 4a formed on the support member 4. Thus, the rotor shaft 61 moves in the direction of the axis L when it is rotated.

A case 62 of the step motor 6 is fixed in an airtight manner to the upper end of the valve housing 1 by welding and such. A magnet rotor 63 having a multiple magnetized outer circumferential part is rotatably arranged inside the case 62, and the rotor shaft 61 is fixed to this magnet rotor 63. Furthermore, a rotation stop mechanism 64 which regulates the rotation of the magnet rotor 63 is provided at a roof portion of the case 62.

Furthermore, there is provided a stator coil 65 arranged at the outer circumference of the case 62. By applying a pulse signal to the stator coil 65, the step motor 6 makes the magnet rotor 63 to rotate in accordance with the pulse number of the pulse signal. Thus, as the magnet rotor 63 rotates, the rotor shaft 61 which is integral with the magnet rotor 63 rotates and moves in the direction of the axis L, thereby making the valve holder 5 and the valve body 51 to move in the direction of the axis L.

In the following, the operation of the expansion valve 10 having the above-described structure is explained. FIG. 1 shows a state in which the high-pressure refrigerant is flowing in from the joint pipe 11 (i.e. from the first port 11a), the flow rate of the refrigerant is being controlled, and the expanded refrigerant is flowing out from the joint pipe 12 (i.e. from the second port 3a of the valve seat ring 3). In this case, the first port 11a and inside of the main valve chamber 1A are at high pressure and the second port 3a is at low pressure. Thus, due to this difference in pressure of the refrigerant, the sub-valve 2 is seated on a sub-valve seat 31 located at a circumference of the second port 3a to close the second port 3a. By controlling the position of the valve body 51 in the direction of the axis L using the step motor 6, the flow rate of the refrigerant flowing through between the valve body 51 and the valve port 22a is controlled.

Meanwhile, the compressor 50 is stopped and the flow path switching valve 40 is switched. At this time, by controlling the step motor 6, the valve body 51 is moved in the direction away from the sub-valve 2 (i.e. upward direction), and the compressor 50 is driven again. By doing so, the high-pressure refrigerant flows in from the joint pipe 12 (i.e. from the second port 3a), and the refrigerant flows out from the joint pipe 11 (i.e. from the first port 11a), and in this state the second port 3a is at high pressure and the main valve chamber 1A and the first port 11a is at low pressure. Thus, due to this difference in pressure of the refrigerant, the sub-valve 2 moves away from the sub-valve seat 31, as shown in FIG. 2. In other words, the second port 3a becomes in the fully-open state. As a result, the refrigerant is released and allowed to flow into the first port 11a via the second port 3a and the main valve chamber 1A.

Next, the sub-valve 2 is explained in more detail. Referring now to FIG. 4, the guide member 21 of the sub-valve 2 is formed by pressing the stainless-steel plate and is integrally formed with the disk portion 21a and the three guide plates 211, 212, 213. The disk portion 21a is arranged to intersect perpendicularly with the axis L of the main valve chamber 1A. The three guide plates 211, 212, 213 is arranged to extend upwardly from three locations on a periphery of the disk portion 21a. The respective guide plates 211, 212, 213 are formed into a flat plate and extending in parallel with the axis L so as to form a L-shape with respect to the disk portion 21a. In addition, there is provided a substantially circular-shaped fitting hole 21b formed at a center of the disk portion 21a.

During the press work of the guide member 21, the press work is performed in twice, and portions of the guide plates 211, 212, 213 are pressed from the direction P1 indicated in FIGS. 3A and 4. In addition, portions at an edge of the disk portion 21a other than the guide plates 211, 212, 213 are pressed from the direction P2 indicated in FIG. 4.

The valve seat member 22 of the sub-valve 2 is formed by cutting the stainless-steel. As shown in FIG. 3B, the valve seat member 22 integrally includes a circular truncated cone-like sub-valve portion 221 (shown in FIG. 3B) arranged at a lower portion of the valve seat member 22, a disk-like flange portion 222 formed on a circumference of the sub-valve portion 221, and a ring-like annular boss portion 223 arranged at an upper portion of the valve seat member 22. The annular boss portion 223 is formed such that a thickness thereof becomes thinner towards an end thereof.

In the following, the assembly of the sub-valve 2 having the above-described structure is explained. The annular boss portion 223 of the valve seat member 22 is passed through the fitting hole 21b of the guide member 21, and while the flange portion 222 is in contact with a back face of the disk portion 21a, an end of the annular boss portion is crimped (i.e. deformed) so as to extend outward. By doing so, the guide member 21 and the valve seat member 22 are bonded together. Then, the spot welding is applied to a contact portion at which the edge of the disk portion 21a of the guide member 21 and the edge of the flange portion 222 of the valve seat member 22 contact each other. This contact portion is indicated in FIG. 3A with a dotted arc.

In case the guide member 21 and the valve seat member 22 are bonded together only by the crimping, the guide member 21 may fall from the valve seat member 22 if the crimping of the annular boss portion 223 is not firm. On the contrary, if the crimping is too firm, then the guide member 21 may be deformed and thus a predetermined clearance between the valve housing cannot be ensured. As a result, in the worst case, the sub-valve 2 may be locked inside of the valve housing 1. In case the guide member 21 and the valve seat member 22 are bonded together only by the spot welding, due to the clearance between the guide member 21 and the valve seat member 22, it is difficult to retain the valve seat member 22 at the center of the guide member 21. Therefore, as described above, by crimping the annular boss portion 223 to perform centering of the guide member 21 with respect to the valve seat member 22 and then applying the spot welding, the guide member 21 and the valve seat member 22 can be firmly fixed to each other in a reliable manner, and in addition to that the valve seat member 22 can be retained at the center of the guide member 21.

As shown in the enlarged cross-sectional view circled by the two-dot chain line in FIG. 4, a shear droop side and a burr which are produced during press work are formed at the edge of the disk portion 21a. However, since the press work is applied to the disk portion 21a from the direction P2 indicated in FIG. 4, the shear droop side is formed on the edge of the disk portion 21a distant from the flange portion 222 of the valve seat member 22, and the burr is formed on the edge of the disk portion 21a adjacent to the flange portion 222. The disk portion 21a is formed so as to have a diameter slightly larger than the diameter of the flange portion 222. Thus, by locating the burr at outside of the flange portion 222, this burr portion will melt during the spot welding. As a result, the disk portion 21a and the flange portion 222 can be closely-attached to each other without any space between each other, and thus the spot welding can be performed more reliably.

The guide plates 211, 212, 213 of the sub-valve 2 have a flat-plate shape. Edges at both ends (i.e. side edges) of the respective guide plates 211, 212, 213 extending parallel to the axis L are arranged to slidably-contact in a line contact fashion with an inner circumferential face 1a1 (shown in FIG. 3A) of the body portion 1a and are slidably movable in the direction of the axis L inside the main valve chamber 1A. Furthermore, since the guide plates 211, 212, 213 have a flat-plate shape, a gap is produced between the guide plates 211, 212, 213 and the inner circumferential face 1a1, thereby preventing foreign particles from being caught in the gap between the guide plates 211, 212, 213 and the inner circumferential face 1a1. Therefore, the slide movement of the sub-valve 2 can be performed in a stable fashion.

Furthermore, when pressing the guide member 21 of the sub-valve 2, since the portions corresponding to the guide plates 211, 212, 213 are pressed from the direction P1 indicated in FIG. 3A, burr sides are formed at the inner side and the shear droop side is formed on a portion which contacts in a line contact fashion with the inner circumferential face 1a1. Therefore, the slide movement of the sub-valve 2 can be performed in a stable fashion.

Moreover, for the sub-valve 2, the guide member 21 is a light-weight member made of a thin stainless-steel plate. Thus, when compared with the conventional sub-valve formed entirely by cutting which is disclosed in Japan Patent Application Publication No. 2009-287913 (i.e. the valve seat member 2), for example, the sub-valve 2 according to the present invention can be reduced in weight. Thus, when the sub-valve 2 transits from the state of FIG. 1 to the state of FIG. 2, the sub-valve 2 can be lifted up easily and can operate in a stable fashion. Furthermore, since the valve seat member 22 is formed by cutting, the valve port 22a can be formed with high accuracy, thereby preventing the valve leakage and providing the expansion valve with high reliability.

During the assembly of the above-described expansion valve, the valve seat ring 3 is press-fitted into the tubular portion 1b of the valve housing 1 from inside, and the joint pipe 12 having the brazing filler metal fitted to the joint pipe 12 is inserted into this tubular portion 1b. The joint pipe 11 having the similar brazing filler metal which is fitted to the joint pipe 11 is also inserted into the body portion 1a. Then, the assembled assembly is heated in a furnace of a brazing device which is absent of flux, thereby brazing the joint pipes 11, 12 to the valve housing 1. Depending on the atmosphere condition inside of the brazing device, it is difficult to control the flow rate of the molten brazing filler metal. Thus, when the brazing filler metal flows through the second port of the valve seat ring, the brazing filler metal may adhere to an abutment face at which the valve seat ring and the sub-valve abut each other, which may cause formation of a non-uniform shape which increases risk of valve leakage. In this regard, advantageously, the valve seat ring 3 according to this embodiment is provided with a groove 32 formed on an inner circumferential face of the second port 3a adjacent to the joint pipe 12. Thus, the brazing filler metal flowing out from the joint pipe 12 towards the valve seat ring 3 will flow into the groove 32 and does not reach to the valve seat 31.

Figure 6A:
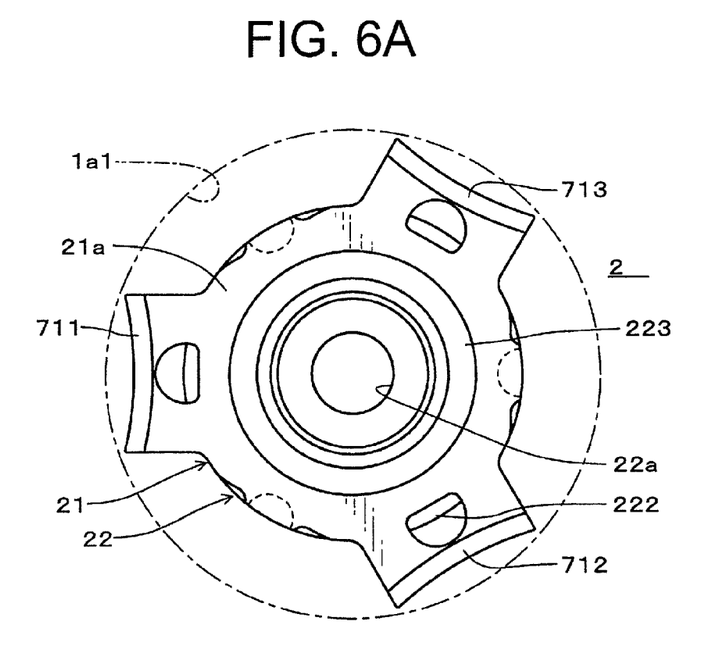
FIG. 6A is another exemplary embodiment of a sub-valve according to the present invention.
Figure 6B:
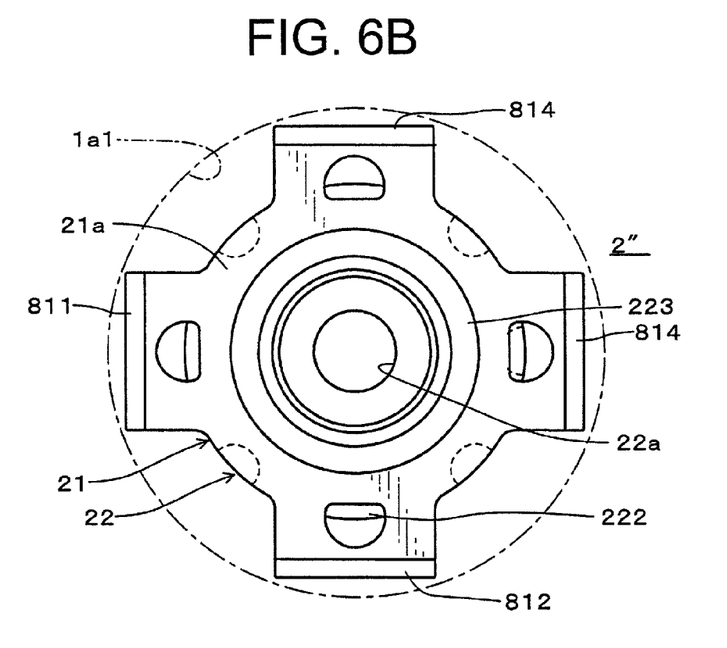
FIG. 6B is another exemplary embodiment of a sub-valve according to the present invention.

In the embodiment described above, the sub-valve 2 has the guide plates 211, 212, 213 formed into the flat-plate shape; however, as shown in FIG. 6A, there may be provided a sub-valve 2' having guide plates 711, 712, 713 formed into an inwardly-curved shape. In FIGS. 6A and 6B, elements similar or corresponding to that of the above-described embodiment (shown in FIGS. 3A and 3B) are indicated with the same reference signs to omit explanation. The guide plates 711, 712, 713 are curved in a direction opposite to the inner circumferential face 1a1 of the valve housing 1 so that there is a gap formed between the inner circumferential face 1a1 of the body portion 1a and the guide plates 711, 712, 713. In this case also, the burr produced by the press work is formed at inner side.

Furthermore, in the embodiments described above, the sub-valve 2, 2' is provided with three guide plates; however, as shown in FIG. 6B, there may be provided a sub-valve 2" having four guide plates 811, 812, 813, 814. Preferably, the number of the guide plates is three or four. This is because as the number of the guide plates increases, the gap between the inner circumferential face 1a1 of the body portion 1a and the guide plate becomes narrow, causing an increase in chance of foreign particles being caught in the gap. In addition, there may also be a problem of interference with the joint pipe 11. These four guide plates may also be formed into a curved shape curved in a direction opposite to the inner circumferential face 1a1 of the valve housing 1. In this case also, the burr produced by the press work is formed toward inside.

What is claimed is:

1. An expansion valve having:
   a valve housing defining a cylindrical main valve chamber;
   a first port communicated with the main valve chamber;
   a second port communicated with an axial end of the main valve chamber;
   a sub-valve arranged in the main valve chamber so as to move in a direction of an axis of the main valve chamber, the sub-valve having a valve port located between the main valve chamber and the second port; and
   a valve body arranged to move in the direction of the axis of the main valve chamber with respect to the sub-valve to open and close the valve port,
   wherein when a refrigerant flows from the first port to the second port, the sub-valve is seated on a circumference of the second port due to difference in pressures in the first port and the second port to make the second port to be in a closed state and a flow rate of the refrigerant flowing through the valve port is reduced by the valve body, and when the refrigerant flows from the second port to the first port, the sub-valve moves away from the second port due to difference in pressures in the first port and the second port to make the second port to be in a fully-open state,
   wherein the sub-valve comprises:
   a guide member arranged to slidably contact with an inner circumferential face of the valve housing and formed by pressing a metal plate; and
   a valve seat member having the valve port and arranged at a center of the guide member, the valve seat member being formed by cutting a metal material
   wherein the guide member includes a disk portion arranged to intersect perpendicularly with the axis of the main valve chamber and a fitting hole formed at a center of the disk portion,
   wherein the valve seat member includes a disk-like flange portion and a ring-like annular boss portion formed at an upper part of the flange portion, and
   wherein the annular boss portion of the valve seat member is passed through the fitting hole of the guide member, and an end of the annular boss portion is crimped so as to extend outward to bond the flange portion and the disk portion tightly together, and a welding is applied to a contact portion at which an edge of the disk portion and an edge of the flange portion contact each other to firmly fix the guide member and the valve seat member to each other.

2. The expansion valve according to claim 1, wherein the guide member includes a plurality of guide plates extending perpendicularly from a periphery of the disk portion.

3. The expansion valve according to claim 2, wherein a plurality of burrs formed, due to the pressing, on side edges of the guide plate extending parallel to the axis of the main valve chamber are located at inner side, and a shear droop side formed, due to the pressing, on an edge of the disk portion at which the spot welding is applied, is located on the edge of the disk portion away from the flange portion.

4. The expansion valve according to claim 3, wherein only the side edges of the guide plate extending parallel to the axis of the main valve chamber are arranged in contact with an inner circumferential face of the valve housing, so that when the sub-valve moves in the direction of the axis of the main valve chamber, the guide plate contacts in a line contact fashion with the inner circumferential face of the valve housing.

5. The expansion valve according to claim 4, wherein the guide plate is formed into a flat-plate shape.

6. The expansion valve according to claim 4, wherein the guide plate is curved in a direction opposite to the inner circumferential face of the valve housing.

7. The expansion valve according to claim 3, wherein the guide plate is formed into a flat-plate shape.

8. The expansion valve according to claim 3, wherein the guide plate is curved in a direction opposite to the inner circumferential face of the valve housing.

9. The expansion valve according to claim 2, wherein only the side edges of the guide plate extending parallel to the axis of the main valve chamber are arranged in contact with an inner circumferential face of the valve housing, so that when the sub-valve moves in the direction of the axis of the main valve chamber, the guide plate contacts in a line contact fashion with the inner circumferential face of the valve housing.

10. The expansion valve according to claim 9, wherein the guide plate is formed into a flat-plate shape.

11. The expansion valve according to claim 9, wherein the guide plate is curved in a direction opposite to the inner circumferential face of the valve housing.

12. The expansion valve according to claim 2, wherein the guide plate is formed into a flat-plate shape.

13. The expansion valve according to claim 2, wherein the guide plate is curved in a direction opposite to the inner circumferential face of the valve housing.

14. The expansion valve according to claim 2, wherein the plurality of guide plates are arranged in a rotationally-symmetrical fashion around the axis of the main valve chamber, and the number of the guide plates is three or four.

* * * * *